(12) United States Patent
Ramani et al.

(10) Patent No.: US 7,725,884 B2
(45) Date of Patent: May 25, 2010

(54) SYSTEM AND METHOD FOR COMPILING MARKUP FILES

(75) Inventors: Sundaram Ramani, Redmond, WA (US); Robert A. Relyea, Bellevue, WA (US); Jeffrey L. Bogdan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1586 days.

(21) Appl. No.: 10/715,136

(22) Filed: Nov. 18, 2003

(65) Prior Publication Data

US 2005/0108694 A1 May 19, 2005

Related U.S. Application Data

(63) Continuation-in-part of application No. 10/377,313, filed on Feb. 28, 2003, now Pat. No. 7,120,618.

(51) Int. Cl.
*G06F 9/45* (2006.01)

(52) U.S. Cl. .................. 717/143; 717/144; 717/147

(58) Field of Classification Search ................ None
See application file for complete search history.

(56) References Cited

U.S. PATENT DOCUMENTS

| | | | | |
|---|---|---|---|---|
| 6,480,865 | B1 * | 11/2002 | Lee et al. ................ | 715/523 |
| 2002/0169999 | A1 * | 11/2002 | Bhansali et al. ............ | 714/26 |
| 2003/0233397 | A1 * | 12/2003 | Katz et al. ................ | 709/200 |
| 2004/0015840 | A1 * | 1/2004 | Walker .................... | 717/108 |
| 2004/0172617 | A1 * | 9/2004 | Ramani et al. ............ | 717/114 |
| 2004/0194072 | A1 * | 9/2004 | Venter .................... | 717/140 |

OTHER PUBLICATIONS

"A template-based approach to XML parsing in C++", J. Dubchak, Jun. 2003, pp. 1-6. Online retrieved at <http://delivery.acm.org/10.1145/780000/774730/6655.html>.*
"Supporting document and data views of source code", Collard et al., Nov. 2002, pp. 34-41. Online retrieved at <http://delivery.acm.org/10.1145/590000/585066/p34-collard.pdf>.*
"Transforming the .NET intermediate language using path logic programming", Drape et al., Oct. 2002, pp. 133-144. Online retrieved at <http://delivery.acm.org/10.1145/580000/571171/p133-drape.pdf>.*

* cited by examiner

*Primary Examiner*—Tuan Q Dam
*Assistant Examiner*—Thuy Dao
(74) *Attorney, Agent, or Firm*—Shook Hardy & Bacon LLP (57) ABSTRACT

The present invention is directed to a method and system for compiling a markup language file into an executable application or library dll. The system may also compile a code-behind file associated with the markup language file. The compiling system may include a parser for parsing the markup language file and providing the compiling system with detailed token information to the compiling system. This token information could be user code snippets or non-code token information such as tags, properties or events in the markup. The compiling system may also include a binary file generator for generating a binary file from the non-code token information, wherein the binary file contains one record for each non-code token. Additionally, the system may include a code generator for generating a language-independent tree of code expressions based on the token information, wherein the code expressions represent the markup language file as a class. A compiler may compile the binary files and code files to create an executable application.

22 Claims, 7 Drawing Sheets

SYSTEM AND METHOD FOR COMPILING MARKUP FILES

CROSS-REFERENCE TO RELATED APPLICATIONS

This application is a continuation-in-part application of application Ser. No. 10/377,313, filed Feb. 28, 2003, now U.S. Pat. No. 7,120,618.

STATEMENT REGARDING FEDERALLY SPONSORED RESEARCH OR DEVELOPMENT

None.

TECHNICAL FIELD

Embodiments of the present invention relate to the field of compilers. More particularly, embodiments of the invention are directed to a system and method for compiling markup language files into full-fledged applications or dynamic link libraries (DLLs).

BACKGROUND OF THE INVENTION

With the growth of Internet use, the use of web programming languages such as markup languages has become widespread. A markup language is a notation system for describing documents in which the text of documents is intermixed with markup or annotations that describe aspects of the structure or format of a document. Markup languages include such languages as Extensible Markup Language (XML), Hypertext Markup Language (HTML), Standard Generalized Markup Language (SGML), and Transaction Authority Markup Language (XAML). These markup languages are typically used to create documents that are deployed the web.

A tool is needed for enabling the creation of a real executable application or a dynamic link library (dll) that can be reused in one or more executable applications, using a markup language. Writing an application declaratively enables a Rapid Application Development (RAD) environment, thus greatly reducing the time it takes to write a typical application program. Furthermore, the ability to mix both markup and code-behind files enables the development of an application that has the best of both the Web Applications and traditional applications written in a language like C#. Thus, a markup language can be used just like any other traditional coding language to build real applications and libraries, but with the ease of use that comes with the declarative nature of a markup language.

BRIEF SUMMARY OF THE INVENTION

Embodiments of the present invention are directed to a system for compiling a markup language file into an executable application. The compiling system includes a parser for parsing the markup language file and providing the compiling system with detailed token information. The system further includes a code generator for generating a language-independent tree of code expressions based on the token information, wherein the code expressions represent the markup file as a class. The compiling system also includes a compiler for compiling the code expressions to create an executable application or a library dll. The compiling system may compile code-behind files along with the markup language files.

In a further aspect, the invention is directed to a compiling system including a parser for parsing the markup language file and providing the compiling system with detailed token information to the compiling system, which may be user specified code snippet tokens or non-code tokens such as tags, properties or events in the markup. The compiling system may also include a binary file generator for generating a binary file from the non-code token information, wherein the binary file contains one record for each non-code token. The system may additionally include a code generator for generating a language-independent code expression representing the root tag in the markup language file as a class. The compiling system also includes a compiler for compiling the code expression to create an executable application or a library dll. The compiling system may compile code-behind files along with the markup language files. The compiling system also adds the binary file generated above into a resource that is embedded into the main application executable or library dll, or into a separate satellite assembly dll for localization scenarios.

BRIEF DESCRIPTION OF THE DRAWINGS

The present invention is described in detail below with reference to the attached drawings figures, wherein.

DETAILED DESCRIPTION OF THE INVENTION

System Overview

Figure 1:
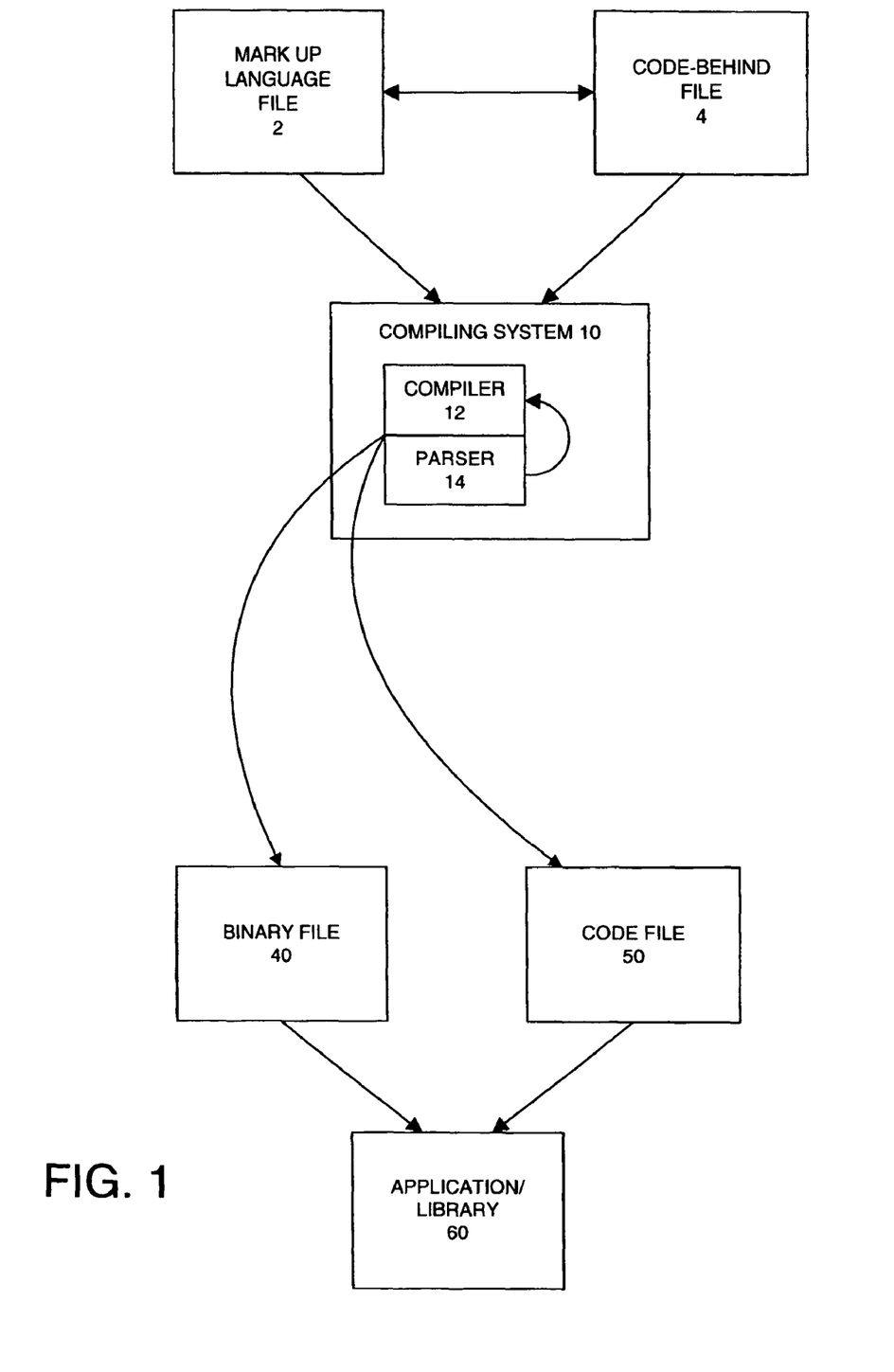
FIG. 1 is a block diagram illustrating flow between components of a system for compiling markup files in accordance with an embodiment of the invention.

Embodiments of the present invention are directed to a system and method for compiling markup files. As illustrated in FIG. 1, a markup language file 2 may be combined with a code-behind file 4. The markup language file may be an XML, SGML, HTML, XAML or any other type of markup file. In particular, in a preferred embodiment, the markup language file 2 is a declarative markup file separating the physical format of the document from its logical structure. The code-behind file 4 may be a high-level language file, such as a C# file, which is associated with the markup file 2 and is used to handle events or includes additional logic to handle advanced scenarios.

A compiling system 10 may receive the markup file 2 and the code-behind file 4 separately or may receive the information from the code-behind file 4 added "inline" inside the markup file 2. The compiling system 10 includes at least a compiler 12 and a parser 14. The parser 14 divides the original files into small components or tokens and passes the tokens to the compiler 12.

In the embodiment of the invention illustrated in FIG. 1, the compiling system 10 responds to a command to create an executable application or dynamic link library (DLL) 60. In order to create the application/DLL 60, the compiling system 10 creates a binary file 40 and a code file 50. The compiling system 10 then combines the files 40 and 50 to create the application or library 60.

Figure 2:
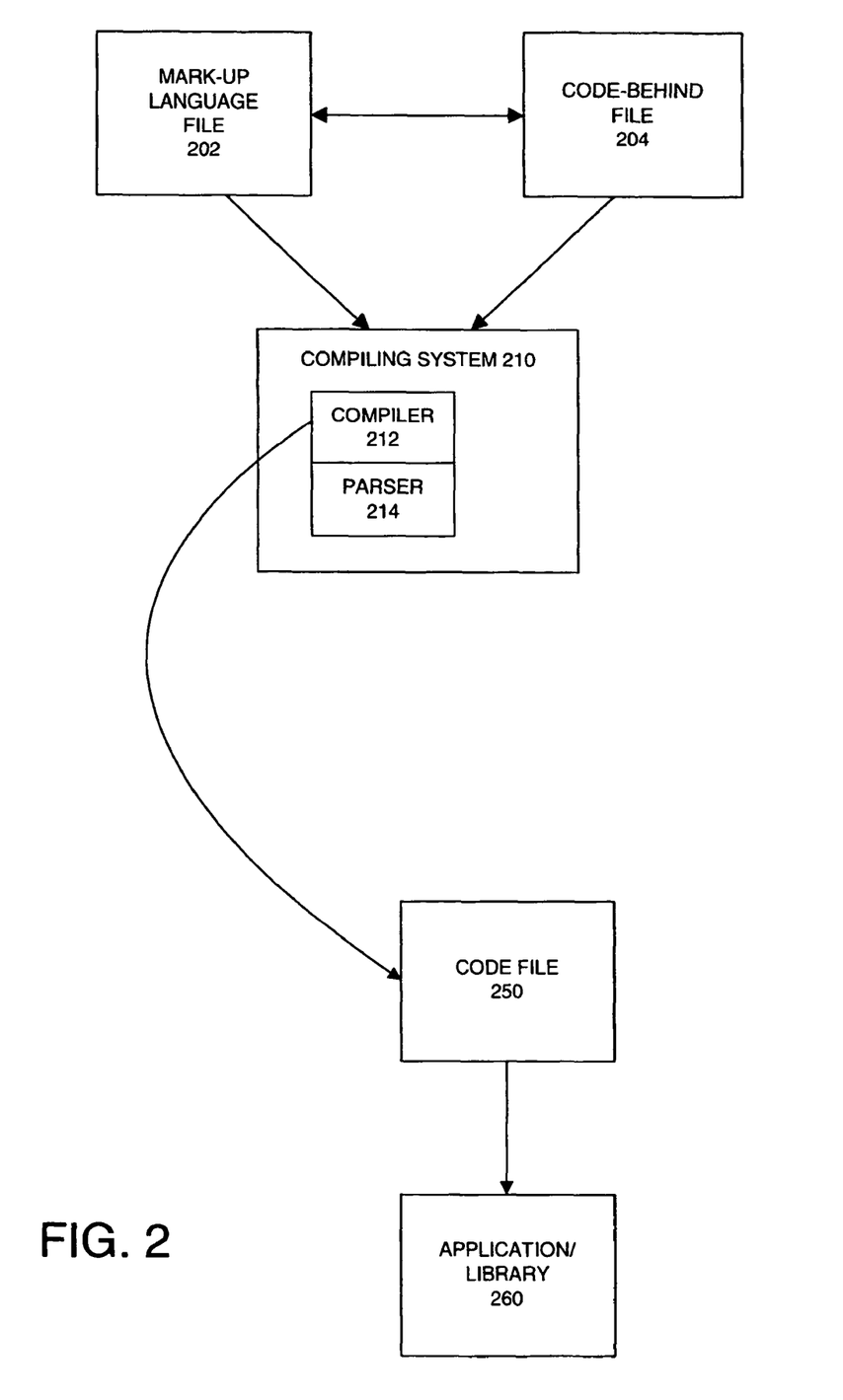
FIG. 2 is a block diagram illustrating flow between components of a system for compiling markup files in accordance with an additional embodiment of the invention.

In an alternative embodiment of the invention illustrated in FIG. 2, a compiling system 210 receives a command to create an Intermediate Language (IL) application or library from the markup file 202 and optionally from the code-behind file 204. In this instance, the compiling system 210 creates the code file 250 and is not required to create a binary file. The IL application or library 260 is generated from the code file 250.

Additional details of the compiling system and method will be described below with respect to FIG. 3-6. The compiling system operates in a computerized environment and may be stored in any of the memory devices described below with reference to the exemplary operating environment of FIG. 7.

Exemplary Operating Environment

Figure 7:
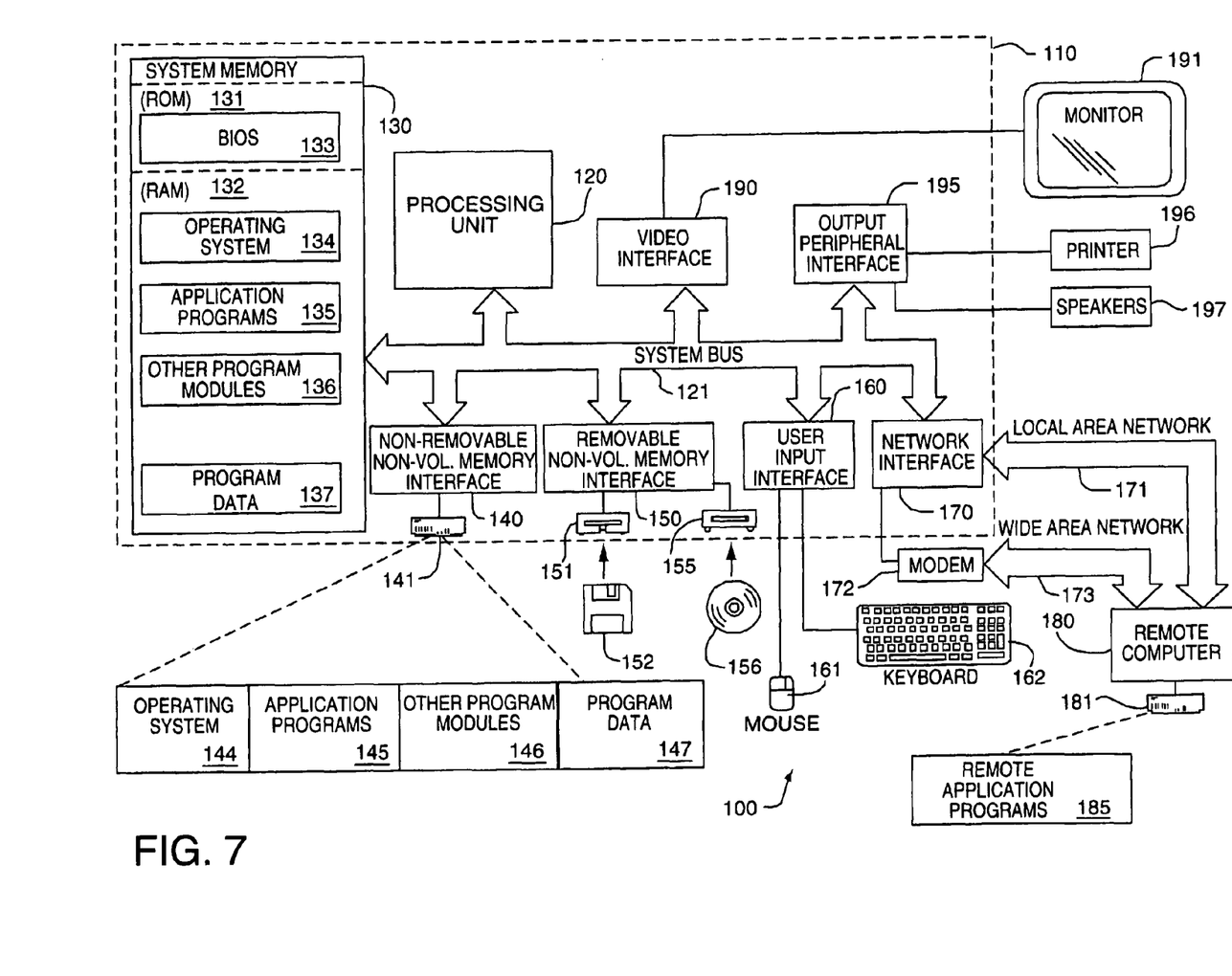
FIG. 7 is an exemplary computing environment in which the present invention may be practiced.

FIG. 7 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 7, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Compiling System

As set forth above, FIG. 1 illustrates a markup language file 2 that may be combined with a code-behind file 4. The markup language file may be an XML, SGML, HTML, XAML, or any other type of markup file. In particular, in a preferred embodiment, the markup language file 2 is a declarative markup file separating the physical format of the document from its logical structure. The code-behind file 4 may be a high-level language file, such as a C# file that is associated with the markup file 2 and is used to handle events or includes additional logic to handle advanced scenarios. A compiling system 10 may receive the markup file 2 and the code-behind file 4 separately or may receive the code added "inline" inside the markup file itself.

Figure 3:
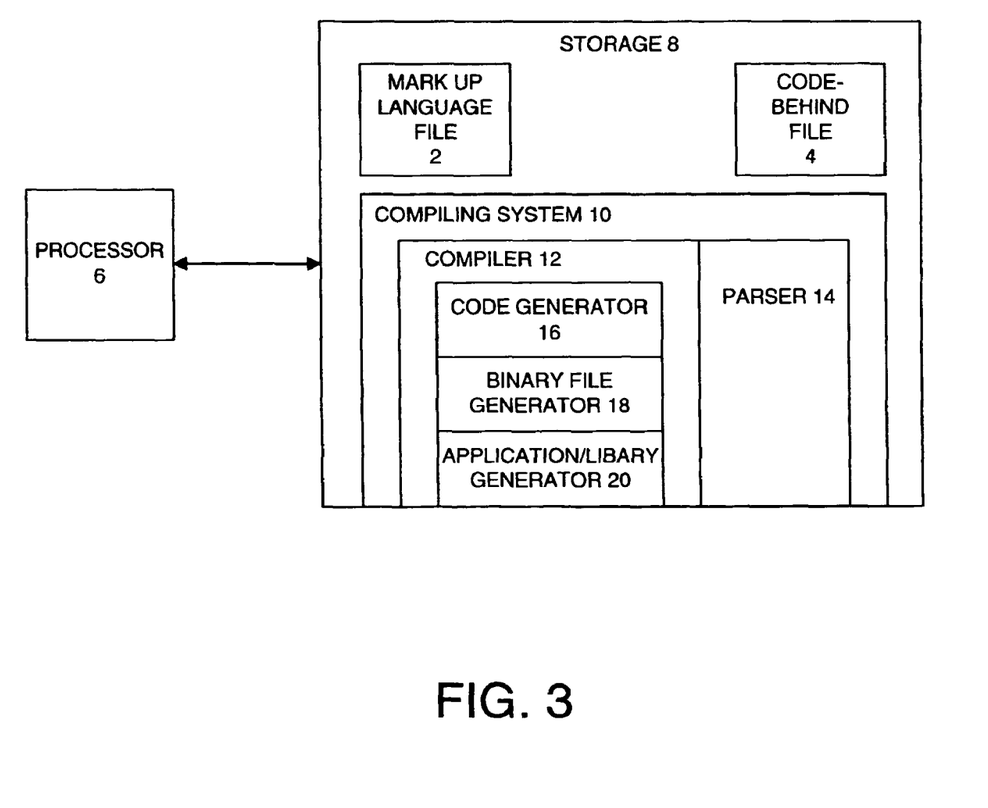
FIG. 3 is a block diagram illustrating a system for compiling markup files in accordance with an embodiment of the invention.

FIG. 3 illustrates further details of the compiling system 10. The markup language file 2 and the code-behind file 4 may be housed in a storage facility 8 along with the compiling system 10. Alternatively, the markup language file 2 and code-behind file 4 may be stored in an alternative storage area in the computing environment 100 shown in FIG. 7 or in an alternative computing environment. The compiling system 10 communicates with a processor 6 to compile the markup language file 2 and the code-behind file 4. The processor 6 and the storage area 8 may encompass any processor or storage area as described above with reference to FIG. 7.

The compiling system 10 may include a compiler 12 having a code generator 16, a binary file generator 18 and an application/library generator 20. The compiling system 12 may further include a parser 14. The functions of each of these components are further described below with reference to FIGS. 4-6.

Figure 4:
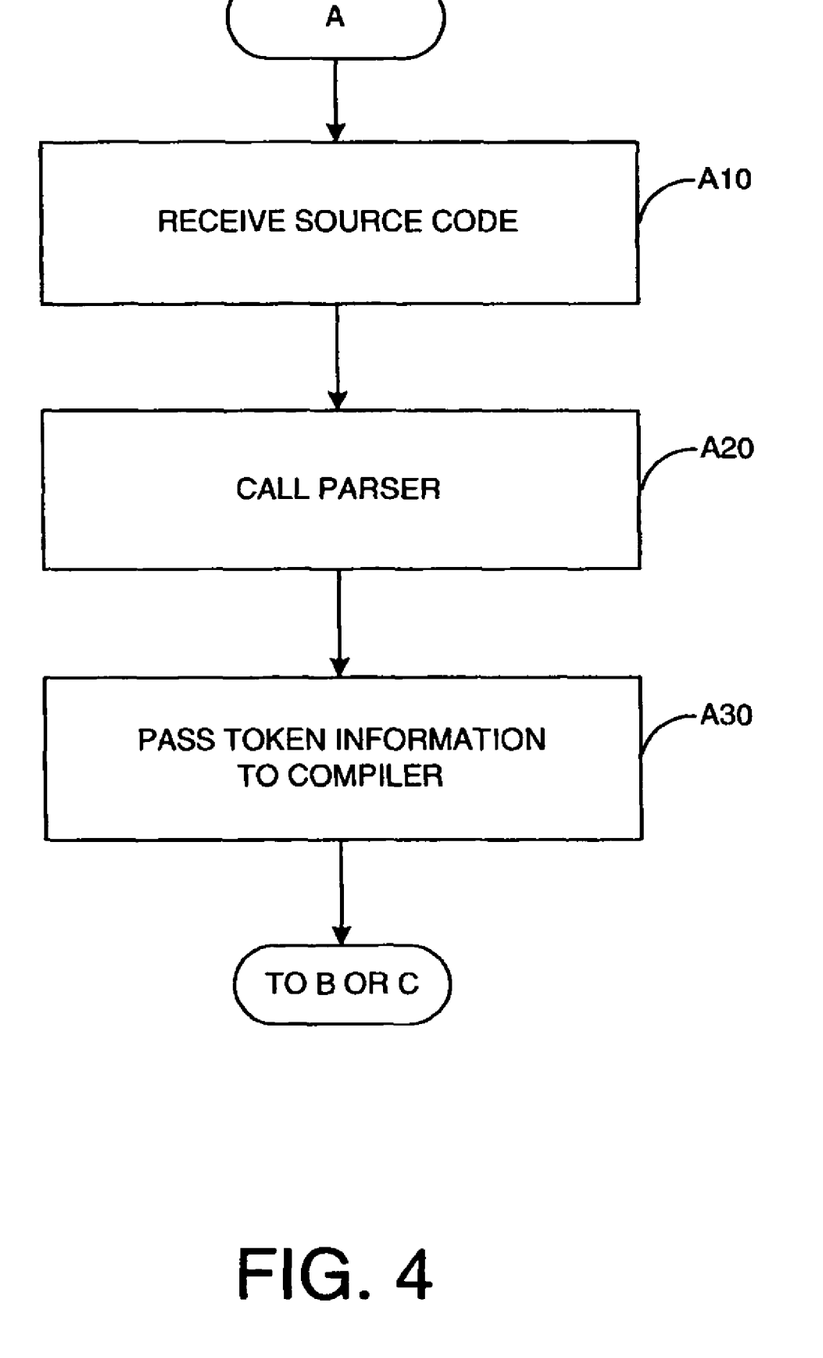
FIG. 4 is a flow chart illustrating a method for compiling markup files in accordance with an embodiment of the invention.

FIG. 4 illustrates a first set of steps involved in a method for compiling markup files. In step A10, the compiler 12 receives the markup file 2. In step A20, the compiler 12 calls the parser 14 to divide the markup file 2 into tokens for analysis. In step A30, the parser 14 makes callbacks to the compiler 12 to pass in detailed information about the parsed token. This detailed information could include a tag, a class, a property, an event, or an inline user code snippet.

Figure 5:
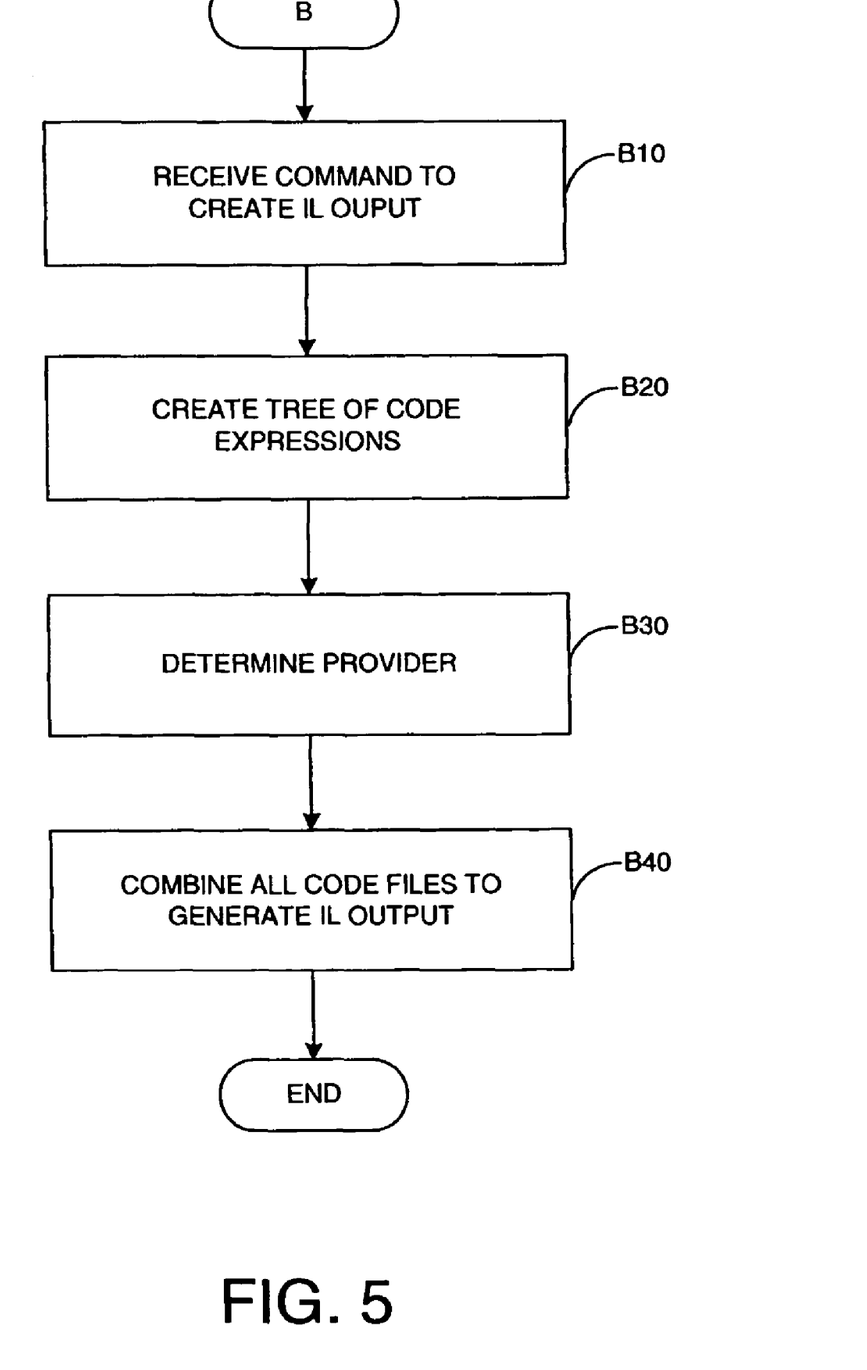
FIG. 5 is a flow chart illustrating further aspects of a method for compiling markup files in accordance with an embodiment of the invention.

FIG. 5 illustrates subsequent steps that occur when the compiling system 10 is asked to create an IL library or application. This scenario corresponds to the block diagram of FIG. 2. In step B10, the compiling system 210 receives a command to create IL output. In step B20, the compiling system 210 uses the code generator 16 (FIG. 3) to create a tree of code expressions that represent the markup file 202 parsed as an equivalent class. A root code expression represents a class that subclasses a root tag of the markup file being parsed. The class has a code expression that includes the remainder of the code expression tree representing code for the creation and initialization of the remaining tags under the scope of a root markup tag. For example, Given the following markup:

```
<FlowPanel xmlns="http://schemas.microsoft.com/2003/xaml">
    <Button ID="b1">hello</Button>
</FlowPanel>
```

The following code may be generated:

```
using System.Windows.Controls;
public class __Page1 : FlowPanel
{
    protected internal Button b1;
    public __Page1( )
    {
        this.__InitializeThis( );
    }
    private void __InitializeThis( )
    {
        FlowPanel __FlowPanel__1__ = this;
        Button __Button__2__ = new Button( );
        this.b1 = __Button__2__;
        __Button__2__.ID = "b1";
        __FlowPanel__1__.Children.Add(__Button__2__);
        __Button__2__.Content = "hello";
    }
}
```

In step B30, the compiling system 210 determines a code provider for generating code in an appropriate language from the language-independent code expression tree that the compiling system 210 created in step B20. Finally, in step B40, the compiling system 210 uses the application/library generator 20 to compile the code files generated from each markup page file that is passed as input to the compiling system, together into the requested IL application or DLL.

Figure 6:
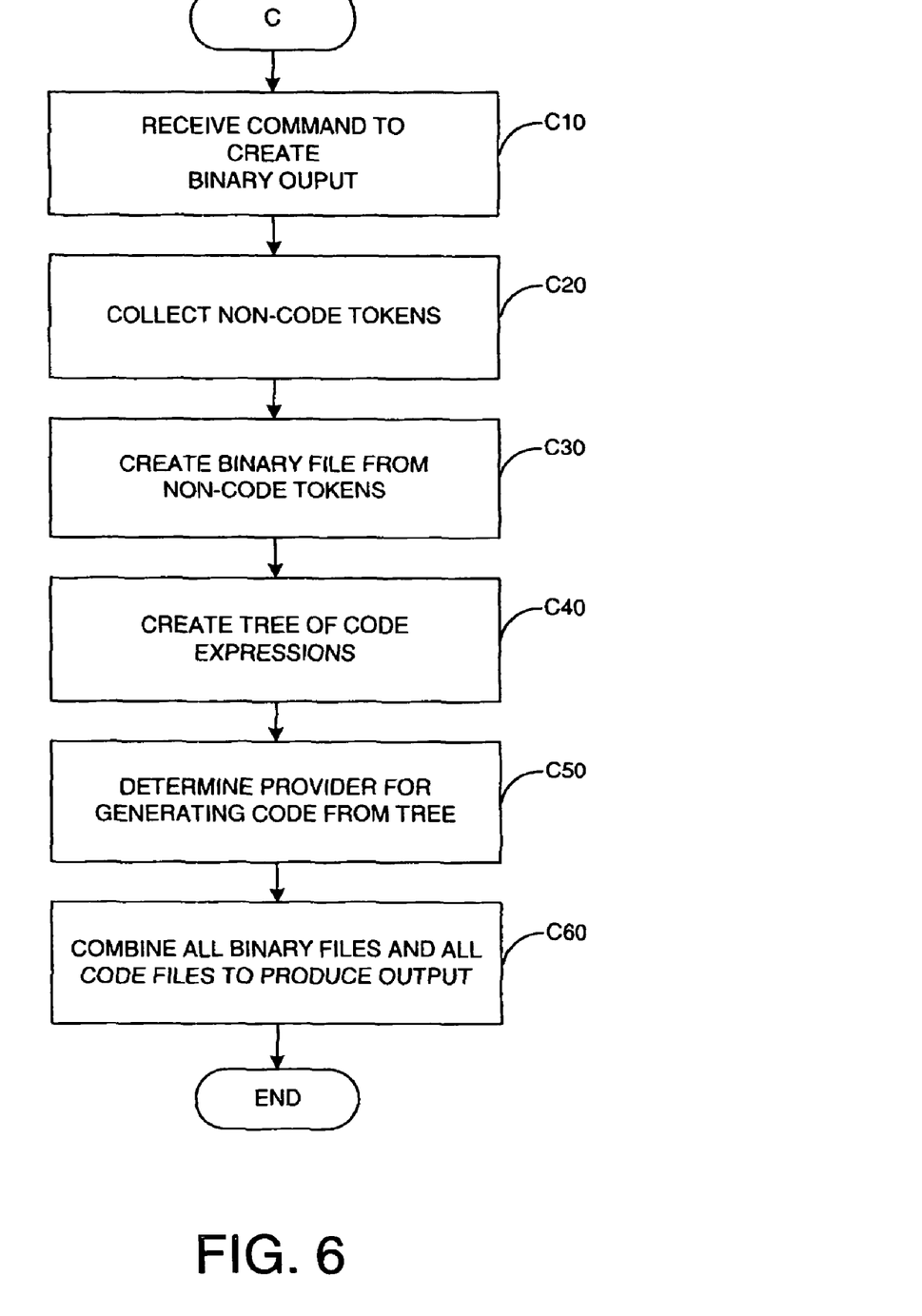
FIG. 6 is a flow chart illustrating further aspects of a method for compiling markup files in accordance with an alternative embodiment of the invention.

FIG. 6 illustrates the steps performed if the compiling system 10 receives a command to create an application or library that contains a binary tokenized representation of the markup file 2 in step C10. In step C20, the binary file generator 18 takes any non-code tokens passed back to the compiler 12 by the parser 14 in step A30 and generates a binary file in step C30 that contains a flattened hierarchy of records. A non-code token is a token that does not have any user code associated with it. For example, the non-code token could be a tag or property token. One record will be present in the created binary file for each unique non-code token passed back to the compiler 12 by the parser 14.

In step C40, the code generator 16 generates a code expression representing a class that subclasses a root tag of the markup being parsed. In a constructor of this class, the code generator 16 generates code to load the binary format file created in step C30 as a resource. The code generator 16 adds appropriate code expressions for any code associated tokens such as events or user code snippets, if present, to the subclass created above. For example, Given the same markup snippet above:

```
<FlowPanel xmlns="http://schemas.microsoft.com/2003/xaml">
    <Button ID="b1">hello</Button>
</FlowPanel>
```

The following code may be generated along with a binary file called page1.binaryfile:

```
using System.Windows.Controls;
using System.IO;
public class _Page1 : FlowPanel
{
  protected internal Button b1;
  public _Page1( )
  {
    this._InitializeThis( );
  }
  private void _InitializeThis( )
  {
    MemoryStream stream = LoadBinaryFileFromResource("page1.binaryfile");
    System.Windows.Serialization.Parser.LoadBinaryFile(stream, this);
  }
}
```

In step C50, the compiler 12 determines a code provider for generating code in the appropriate language from the language-independent code expression that the compiling system 210 created in step C40. After step C50, each page of markup that is passed as input to the compiling system, has generated one binary file and one code file. In step C60, the application/library generator 20 takes all the code files generated from each markup page file in the current project and compiles them into an application executable or library DLL. Additionally, the application/library generator 20 combines all of the binary files generated for each markup page file in the project into a single resource and embeds that resource in the main application executable or library assembly dll or alternatively into a satellite assembly dll.

The system and method described above fully utilize the advantages of declarative markup by enabling a rapid application development (RAD) environment that enables programmers to quickly build working programs or library dlls. Furthermore, the above-described system and method provides the ability to mix both markup and code-behind files to enable the development of an application that takes advantage of the best of web applications and Win32™ (trademark of the Microsoft Corporation of Redmond, Wash.) applications. Finally, the system and method described above provide a language-agnostic technique for building an application when no user code is involved.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for compiling a markup language file into an executable application, the method comprising:
   receiving a markup language file;
   receiving a C# file, the C# file being associated with the markup language file;
   parsing the markup language file into tokens and providing a compiling system with detailed information about the parsed tokens, the detailed information including inline code from the associated C# file;
   receiving a command to create an intermediate language application;
   upon receipt of the command to create an intermediate language application, generating a language-independent tree of code expressions based on the token information, wherein the code expressions represent the markup language file as a class; and
   compiling the code expressions generated from the markup language file to create the executable application.

2. The method of claim 1, further comprising providing a tag as detailed token information.

3. The method of claim 1, further comprising providing a property or event as the detailed token information.

4. The method of claim 1, further comprising providing a user code snippet as the detailed token information.

5. The method of claim 1, further comprising generating a binary file from non-code token information, wherein the binary file contains one record for each non-code token.

6. A compiling system embodied on a computer readable storage medium for compiling a markup language file into an executable application, the compiling system comprising:
   a parser for parsing the markup language file and providing the compiling system with detailed token information, wherein the markup language file is associated with at least one C# file;
   a code generator for generating a language-independent tree of code expressions based on the token information, wherein the code generator receives code in the at least one C# file inside the markup language file, and wherein the code expressions represent the markup file as a class; and
   a compiler for compiling the code expressions to create the executable application, wherein the compiler determines an appropriate code provider for generating code in an appropriate language in response to the language-independent tree of code expressions.

7. The compiling system of claim 6, wherein the detailed token information comprises a tag.

8. The compiling system of claim 6, wherein the detailed token information comprises a property or event.

9. The compiling system of claim 6, wherein the detailed token information comprises a user code snippet.

10. The compiling system of claim 6, wherein the compiler is configured to compile the markup language file and the at least one C# file.

11. The compiling system of claim 6, wherein the executable application is an intermediate language application.

12. The compiling system of claim 6, further comprising a binary file generator for generating a binary file from non-code token information, wherein the binary file contains one record for each non-code token.

13. A method for compiling a markup language file into an executable application, the method comprising:
   receiving the markup language file;
   receiving at least one code-behind file, wherein the at least one code-behind file contains a user code snippet and is associated with the markup language file;
   parsing the markup language file into tokens and providing a compiling system with detailed token information, wherein the detailed token information includes non-code token information;

receiving a command to create an application or library containing a binary tokenized representation of the markup language file;

in response to receiving the command to create an application or library containing a binary tokenized representation of the markup language file, generating a binary file from the non-code token information, wherein the binary file contains one record for each non-code token;

generating a language-independent code expression that represents the markup language file as a class, wherein the generated language-independent code expressions includes the user code snippet from the at least one code-behind file; and compiling the code expressions into an executable application, wherein the compiling includes both the markup language file and the at least one code-behind file.

14. The method of claim 13, further comprising combining the binary files into a single resource.

15. The method of claim 13, further comprising providing a tag as the detailed token information.

16. The method of claim 13, further comprising providing a property or event as the detailed token information.

17. A computer readable storage medium having computer executable instructions for performing the method of claim 13.

18. A computer storage medium storing computer useable instructions that, when used by a computing device, cause the computing-device to perform a method for compiling a markup language file into an executable application, the method comprising:

receiving a markup language file;

receiving a C# file, the C# file being associated with the markup language file;

parsing the markup language file into tokens and providing a compiling system with detailed information about the parsed tokens, the detailed information including inline code from the associated C# file;

receiving a command to create an intermediate language application;

upon receipt of the command to create an intermediate language application, generating a language-independent tree of code expressions based on the token information, wherein the code expressions represent the markup language file as a class; and compiling the code expressions generated from the markup language file to create the executable application.

19. The method of claim 18, further comprising providing a tag as detailed token information.

20. The method of claim 18, further comprising providing a property or event as the detailed token information.

21. The method of claim 18, further comprising providing a user code snippet as the detailed token information.

22. The method of claim 18, further comprising generating a binary file from non-code token information, wherein the binary file contains one record for each non-code token.

* * * * *